United States Patent [19]
Flanagan et al.

[11] Patent Number: 5,933,258
[45] Date of Patent: Aug. 3, 1999

[54] OPTICAL COMMUNICATION SYSTEM

[75] Inventors: Thomas P. J. Flanagan, Plano; Siraj E. Elahmadi, Dallas, both of Tex.

[73] Assignee: Northern Telecom, Montreal, Canada

[21] Appl. No.: 08/707,440

[22] Filed: Sep. 4, 1996

Related U.S. Application Data

[60] Provisional application No. 60/003,286, Sep. 6, 1995.
[51] Int. Cl.$^6$ ................................................. H04B 10/08
[52] U.S. Cl. ............................ 359/110; 359/119; 370/222
[58] Field of Search .................................. 359/110, 119, 359/118, 125, 164, 117; 370/221, 222, 223, 224, 225, 226, 227

[56] References Cited

U.S. PATENT DOCUMENTS

| | | | |
|---|---|---|---|
| 5,159,595 | 10/1992 | Flanagan et al. | 370/85 |
| 5,442,623 | 8/1995 | Wu | 370/16.1 |
| 5,446,725 | 8/1995 | Ishiwatari | 370/16.1 |
| 5,457,555 | 10/1995 | Moriyama | 359/110 |
| 5,636,205 | 6/1997 | Suzaki et al. | 370/224 |
| 5,647,035 | 7/1997 | Cadeddu et al. | 359/119 |

OTHER PUBLICATIONS

IEEE Journal of Lightwave Technology "A Novel Passive Protected SONET Bidirectional Self–Healing Ring Architecture," Wu et al. Sep. 10, 1992., No. 9, New York, US. pp. 1314–1322.

IEEE Journal of Lightwave Technology, "Multiwavelength Survivable Ring network Architectures." A.F. Elrefaie. Bellcore, Redbank, NJ 07701,USA., pub: May 23, 1993., pp. 1245–1251.

*Primary Examiner*—Rafael Bacares
*Attorney, Agent, or Firm*—Foley & Lardner

[57] ABSTRACT

A discontinuous ring is formed by separate bidirectional optical communication links, with possibly different transmission speeds, synchronous or asynchronous transmission, and ratios of working to protection channels, each linking a pair of terminals in different nodes of a communication system. To protect protection-switched traffic on a communication link from a link failure, it is routed around the ring via the protection channel of the other communication links. To this end, an optical switch is provided between the protection channel of each link and the associated terminals in each node, and is controlled differently in nodes adjacent the link failure and in nodes not adjacent the link failure to route the protection-switched traffic accordingly. Rapid protection switching is facilitated by controlling the optical switches using wavelength detectors directionally coupled to the protection channel at each node.

20 Claims, 8 Drawing Sheets

OPTICAL COMMUNICATION SYSTEM

This application claims benefit of provisional application Ser. No. 60/003,286, filed Sep. 6, 1995.

This invention relates to communication systems, and is particularly concerned with an optical communication system in which protection is provided against failures, for example due to an optical fiber cable cut.

BACKGROUND OF THE INVENTION

It is known from Flanagan et al. U.S. Pat. No. 5,159,595 issued Oct. 27, 1992 and entitled "Ring Transmission System" to provide an optical communication system in the form of a plurality of nodes coupled in a ring via two multiplexed communication paths providing for transmission in opposite directions around the ring. In normal operation, communications are effected between the nodes in both directions via the two paths. In the presence of a fault such as a fiber cut, this is detected in the two nodes immediately adjacent to the fault, and communications are maintained via both paths forming a folded loop, signals being coupled between the paths at these two nodes adjacent to the fault. Such systems have become known as bidirectional line switched ring (BLSR) systems, and typically serve for communicating SONET signals in which case they are commonly referred to as SONET ring systems.

BLSR systems provide effective fault protection, or survivability, for new communication system installations, but can not be easily applied to already-existing (synchronous or asynchronous) communication systems without requiring costly equipment upgrades. In addition, BLSR systems have disadvantages in that they have a high utilization of optical fibers, do not provide for 1:N (N>1) protection (i.e. protection of N working (W) channels using one protection (P) channel), and they are not bit-rate or wavelength transparent (i.e. a change in wavelength or bit rate, such as a change from SONET OC-48 to OC-192 signals for increased capacity, involves a change in equipment). Furthermore, BLSR systems have the limitations that all nodes around the ring must be of the same type and must have the same capacity.

In order to provide survivability of existing communication systems without replacing them with ring systems, it is possible to use digital cross connects (DCCs) at the nodes of the system for rerouting signals in the event of a link failure. DCCs are electronic switches, for example operating on DS3 signals. However, the use of DCCs involves considerable disadvantages of cost, equipment capacity, complexity, size, and power consumption, and slow protection in the event of a fault.

It has also been proposed to use optical cross connects (OCCs) to provide for survivability of optical communication systems or networks, the OCCs serving to switch optical signals. However, it has been necessary for such OCCs to be large (for example, a 72×72 cross connect for an OC-48 optical signal carrying 16 DS3 signals) and for large numbers of such OCCs to be required in a network. Large OCCs have disadvantages of involving relatively new technology with low or unproved reliability and concerns of crosstalk and loss, as well as having a large size and cost.

It is also known from Wu U.S. Pat. No. 5,442,623 issued Aug. 15, 1995, entitled "Passive Protected Self Healing Ring Network", and from "A Novel Passive Protected SONET Bidirectional Self-Healing Ring Architecture" by Tsong-Ho Wu et al., IEEE Journal of Lightwave Technology, Vol. 10, No. 9, September 1992, to provide a ring network with a passive optical fiber protection ring. In such a network optical switches located at each node serve for protection switching of traffic to the protection ring in the event of a fault. While this can avoid some of the disadvantages of ring systems discussed above, it has disadvantages in that the optical fiber protection ring is unused in normal operation (i.e. in the absence of a fault), the traffic of the ring system in normal operation is conducted via the optical switches with a consequent decrease in the reliability of the system, and the complexity of the optical switching is increased in order to provide, as is desirable, for protection switching for span failures. In addition, this is a ring system which does not address survivability of existing communication systems using point-to-point communication links.

An object of this invention, therefore, is to provide a communication system which avoids or reduces the above disadvantages of the prior art.

SUMMARY OF THE INVENTION

One aspect of this invention provides an optical communication system comprising: a plurality of nodes each comprising two terminals, and a plurality of optical communication links each providing bidirectional communications between a respective pair of terminals in two different nodes, each communication link comprising at least one working channel for normal traffic and a protection channel to which the terminals are arranged to switch the normal traffic of a faulty working channel; wherein each node includes an optical switch via which the protection channels are coupled to the respective terminals in normal operation, the optical switches being arranged and controlled so that, in the event that normal traffic of a faulty working channel of a communication link between two terminals is not restored by a switch to the protection channel of that communication link, the normal traffic is communicated between the two terminals via the optical switches and the protection channels of the other communication links.

The protection channel of each communication link preferably comprises an optical fiber using two different wavelengths for the two directions of transmission on the channel, a first one of the wavelengths being used in normal operation for transmission in a direction on each protection channel fiber corresponding to a clockwise direction around the ring, and a second one of the wavelengths being used in normal operation for transmission in a direction on each protection channel fiber corresponding to a counterclockwise direction around the ring. In this case, preferably each node includes a wavelength detector directionally coupled to the protection channel fiber for detecting an optical signal at at least one of the two wavelengths and providing a control signal for the optical switch of the node.

The invention is applicable to different forms of the communication links. Thus for example the terminals may be arranged to communicate at different transmission speeds on at least two of the communication links, and/or at least one of the pairs of terminals may be arranged to communicate synchronous signals while at least another of the pairs of terminals is arranged to communicate asynchronous signals, and/or at least two of the communication links may have different numbers of working channels.

According to another aspect, this invention provides a node for an optical communications system, the node comprising: first and second terminals for coupling respectively to first and second bidirectional optical communication links each comprising at least one working channel for normal traffic and a protection channel to which the terminal is arranged to switch the normal traffic of a faulty working channel; an optical switch having optical ports T1 and T2 coupled respectively to protection channel optical ports of the first and second terminals and having optical ports F1 and F2 for coupling respectively to the protection channel of the first and second communication links; and a control unit for controlling the optical switch so that in normal operation the ports F1 and T1 are coupled together and the ports F2 and T2 are coupled together, in a first protection state the ports F1 and T2 and/or the ports F2 and T1 are coupled together, and in a second protection state there is a coupling between the ports F1 and F2.

The control unit can be responsive to an alarm signal from the first or second terminal, representing a failure of a protection switch at the terminal to restore traffic from a faulty working channel via the protection channel of the respective communication link, to establish the first protection state. In addition, the control unit can be responsive to a loss of an optical signal received by the first or second terminal via the protection channel of the respective communication link to establish the second protection state.

In an embodiment of the invention described in detail below, the first terminal transmits and receives optical signals via its protection channel optical ports at first and second wavelengths respectively, the second terminal transmits and receives optical signals via its protection channel optical ports at the second and first wavelengths respectively, and the node includes at least one detector directionally coupled to the protection channel of at least one of the first and second communication links for detecting optical signals at the first or second wavelength, the control unit being responsive to the detector for controlling the optical switch.

The node can include a bidirectional optical amplifier or regenerator via which the ports F1 and F2 are coupled in the second protection state.

The invention also provides a method of protecting a plurality of separate bidirectional optical communication links, each comprising at least one working channel for normal traffic between a pair of terminals and a protection channel to which the terminals are arranged to switch the normal traffic of a working channel in the event of a fault on the working channel, comprising the steps of: at each of a plurality of nodes, each comprising two of said terminals associated with two separate communication links whereby the plurality of nodes and communication links form a ring, providing an optical switch arranged in normal operation to couple the protection channel of the two communication links to protection channel ports of the respective terminals; and (i) at at least one of the plurality of nodes, in the event that a protection switch, at one of the two terminals of the node, of normal traffic from a faulty working channel of the associated communication link to the protection channel of the communication link fails to restore the normal traffic, controlling the optical switch to couple the protection channel port of this one of the two terminals to the protection channel of the communication link associated with the other of the two terminals of the node; and (ii) at at least one other node in consequence of the coupling in (i), controlling the optical switch of this other node to provide a coupling between the protection channels of the two communication links at this other node.

Preferably step (i) is carried out at each of two nodes adjacent to a fault resulting in a protection switch at each of said nodes to the protection channel of the communication link between said two nodes and failure of the protection switch to restore the normal traffic between said two nodes, and step (ii) is carried out at each other node.

The control in step (ii) can be achieved via overhead information on the working channel(s), but is more desirably achieved using optical signal detection in the nodes. Thus preferably step (ii) is carried out at each other node in dependence upon an optical signal on the protection channel of a communication link associated with a terminal of the respective node. Step (ii) can also comprise the step of, at at least one node, regenerating or amplifying optical signals coupled between the protection channels of the two communication links at the respective node.

A further aspect of this invention provides a communications system comprising a plurality of separate communication links each between two terminals at respective nodes, each node comprising two terminals associated with different communication links, each communication link comprising at least one working channel for normal traffic and a protection channel for communicating the normal traffic of a faulty working channel of the respective communication link in the event of a protection switch at the respective terminals, the protection channels of the separate connection links forming a discontinuous ring with gaps between the protection channels at the nodes, and a switch at each node via which the protection channels are coupled to the terminals at the node, the switches being operable, in response to a failure of a protection switch to restore communication of normal traffic via the protection channel of a communication link between two terminals at respective nodes, to restore communication of said normal traffic via the protection channels of the communication links around the remainder of the ring and to bridge said gaps between the protection channels at any nodes around said remainder of the ring.

Preferably the communication links comprise optical communication links and the switches at the nodes comprise optical switches. In one form of the system, each protection channel provides bidirectional communications of optical signals at first and second wavelengths for opposite directions of communication, all of the protection channels of the separate communication links using said first wavelength for communications in a first direction around the discontinuous ring and all of the protection channels using said second wavelength for communications in a second direction around the discontinuous ring.

One or more of the nodes can each include a signal regenerator or amplifier via which the switch at this node is arranged to couple the protection channels to bridge the gap between the protection channels at this node. The different communication links and respective terminals can be arranged to communicate different combinations of synchronous and asynchronous signals, different transmission speeds, and/or different numbers of working channels.

BRIEF DESCRIPTION OF THE DRAWING

The invention will be further understood from the following description with reference to the accompanying drawings, in which.

DETAILED DESCRIPTION

Figure 1:
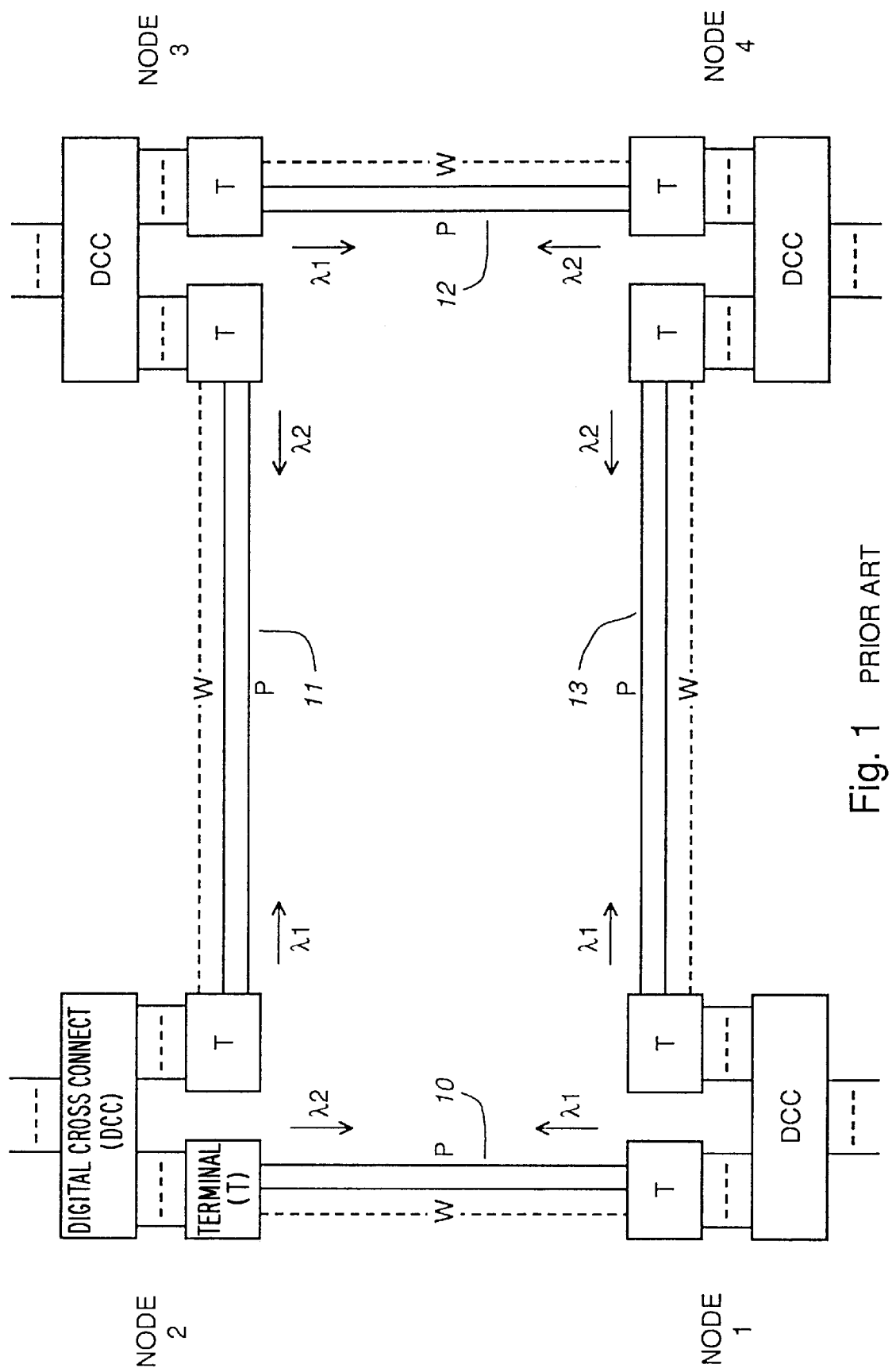
FIG. 1 illustrates a communication system, comprising nodes linked by individual point-to-point communication links, arranged in a known manner.

Referring to FIG. 1, a known communication system is illustrated by way of example as including four nodes 1, 2, 3, and 4. The nodes 1 and 2 are linked by a point-to-point or linear communication link 10 extending between terminals T in these nodes. Similarly, the nodes 2 and 3, 3 and 4, and 1 and 4 are linked by respective linear communication links 11, 12, and 13 extending between respective terminals T in the nodes. The communication links 10 to 13 are separate from one another and can have different forms as described below. The geographical arrangement of the nodes and the communication links 10 to 13 forms a discontinuous ring, but this is not a ring system because the individual communication links are entirely separate from one another, separate terminals T being present in each node for each communication link.

Each of the communication links 10 to 13 comprises bidirectional optical communication paths extending between the respective terminals T, optionally (depending on distances between the nodes) via bidirectional optical amplifiers or regenerators which for clarity are not shown, providing at least one working channel W and a protection channel P. A working channel refers to a channel which carries normal traffic, and a protection channel refers to a channel to which normal traffic is switched to protect it in the event of a fault on the working channel normally carrying that traffic; the protection channel may carry other traffic in normal operation. As illustrated, for each of the communication links 10 to 13 the at least one working channel is represented by a continuous line W, the possible existence of one or more other working channels is indicated by an adjacent broken line, and the protection channel is represented by a continuous line P. Each channel is provided on a respective optical fiber of the communication link, with two different optical wavelengths λ1 and λ2 being used for the two different directions of transmission. It is observed that the choice of which wavelength is used for each direction of transmission on each of the communication links 10 to 13 is relatively arbitrary, because the communication links are separate and independent from one another. For example, as illustrated both of the terminals T of the node 1 transmit using the same wavelength λ1, both of the terminals T of the node 4 transmit using the same wavelength λ2, and the two terminals T of each of the nodes 2 and 3 transmit using the different wavelengths λ1 and λ2.

To illustrate the separate and independent nature of the communication links 10 to 13, it is observed purely by way of example that the communication link 10 could provide asynchronous communications with 1:N protection (N representing the number of working channels and being greater than 1), the communication link 11 could provide SONET OC-48 communications with 1:N protection, the communication link 12 could provide SONET OC-192 communications with 1:N protection, and the communication link 13 could provide SONET OC-192 communications with 1+1 protection (i.e. 1 working channel and 1 protection channel). The value of N can be different on the different communication links. Thus the different communication links can have different numbers of communication paths, different protection ratios, and different transmission rates, and can carry synchronous or asynchronous signals.

Although as described here wavelength division multiplexing (WDM) using two different wavelengths λ1 and λ2 is used for providing bidirectional communication on each fiber, this need not be the case. Separate fibers may be used for the opposite directions of transmission, or other forms of multiplexing may instead be used.

FIG. 1 also shows that each of the nodes 1 to 4 further includes a DCC (digital cross connect) which is arranged to couple electrical signals between the terminals T of the node, and with other equipment and possibly other terminals which are not shown. As explained in the introduction, the DCCs are necessary to reroute traffic in the event of a failure of a communication link. For example, if the fibers in the communication link 13 between the nodes 1 and 4 are cut, then the DCCs in the nodes 1 and 4 can be controlled to reroute some or all of the interrupted traffic between these nodes 1 and 4 via the communication links 10 and 12 to the nodes 2 and 3, and the DCCs in the nodes 2 and 3 can be controlled to route the traffic via the communication link 11 between these nodes. This has considerable disadvantages, for example in that it requires the presence in each node of a large and costly DCC with sufficient spare traffic capacity to handle the rerouted traffic, and the control and rerouting (protection switching) of the traffic is complicated and slow.

Figure 2:
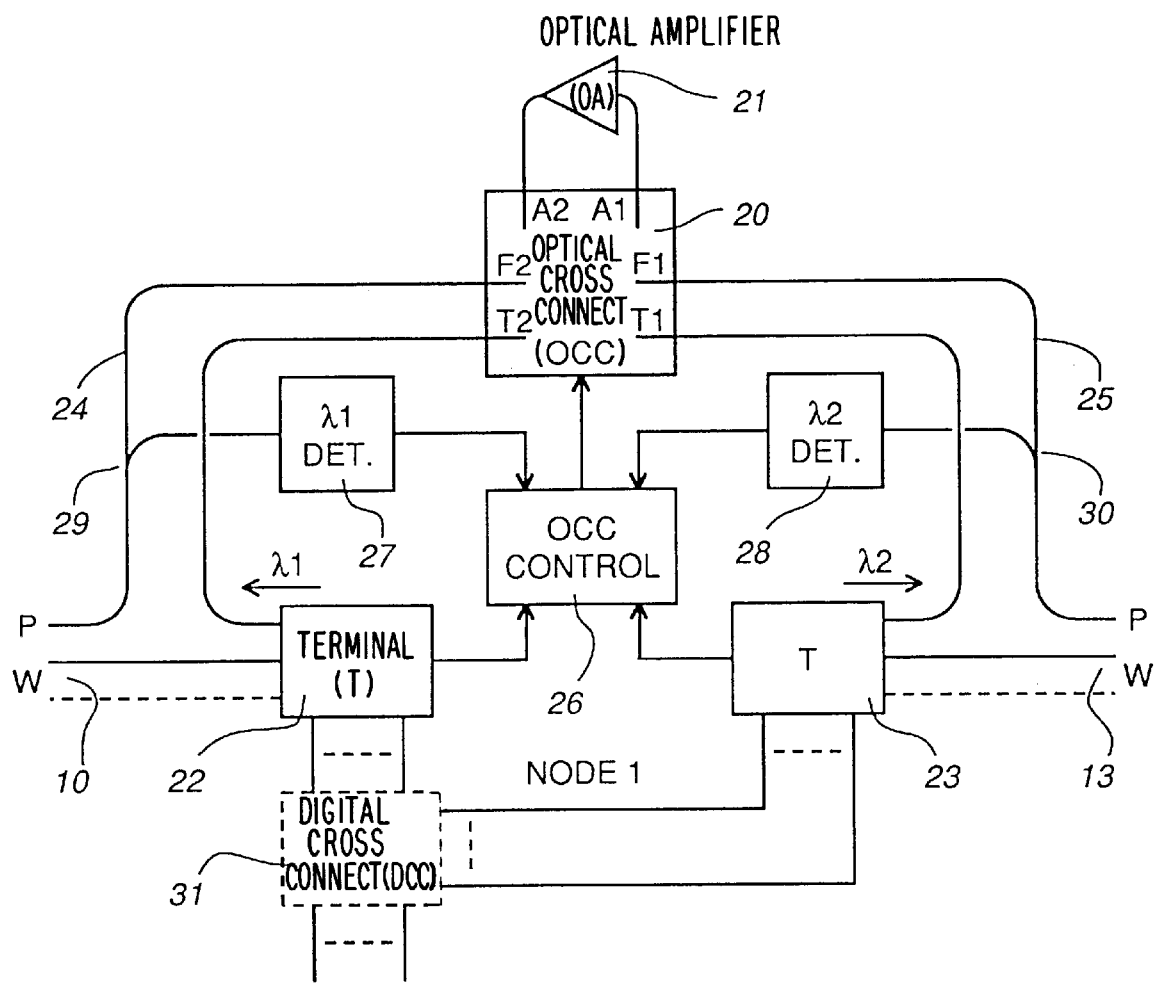
FIG. 2 illustrates a modification of a node in accordance with an embodiment of this invention.

FIG. 2 illustrates a modification of a node in accordance with an embodiment of this invention. The modified node includes a small optical cross connect (OCC) 20, an example of which is described in detail below with reference to FIG. 3, having optical ports T1, F1, A1, T2, F2, and A2. A bidirectional optical amplifier (OA) 21, an example of which is described in detail below with reference to FIG. 4, is coupled via optical fibers between the ports A1 and A2. The node includes two terminals T, the same as in each of the nodes 1 to 4 in FIG. 1, referenced 22 and 23 to which the optical fiber(s) of the bidirectional working channel(s) W of the respective communication links, e.g. 10 and 13 for the node 1 as illustrated, are coupled as in FIG. 1. The bidirectional protection channel P of one communication link, 10 as illustrated, is coupled via an optical fiber 24 to the OCC port F2, and the bidirectional protection channel P of the other communication link, 13 as illustrated, is coupled via an optical fiber 25 to the OCC port F1. The protection channel optical ports of the terminals 22 and 23 are coupled via optical fibers to the OCC ports T2 and T1 respectively. As illustrated, one of the terminals 22 transmits on one of the optical wavelengths λ1 (and receives on the other wavelength λ2), and the other terminal 23 transmits on the other wavelength λ2 (and receives on the one wavelength λ1). This is an additional constraint compared with the nodes in the prior art of FIG. 1, but is easily met simply by interchanging where necessary optical transmitter and receiver cards in the terminals of the nodes.

The modified node of FIG. 2 further includes an OCC control unit 26 and two wavelength detectors 27 and 28 each of which can comprise an optical signal detector coupled to a wavelength filter for a wavelength to be detected in an incoming optical signal. The wavelength detector 27 is directionally coupled at 29 to the optical fiber 24 and serves for detecting the wavelength $\lambda 1$ in the optical signal incoming to this fiber and hence to the node 1 on the protection channel P of the communication link 10. Conversely, the wavelength detector 28 is directionally coupled at 30 to the optical fiber 25 and serves for detecting the wavelength $\lambda 2$ in the optical signal incoming to this fiber and hence to the node 1 on the protection channel P of the communication link 13. The OCC control unit 26 is responsive to electrical output signals from the wavelength detectors 27 and 28, and/or to electrical alarm signals from the terminals 22 and 23, to control the OCC 20 in a desired manner as described below.

FIG. 2 also illustrates by dashed lines that the node may further include a DCC 31 for coupling electrical signals to, from, and between the terminals 22 and 23 and other equipment or terminals (not shown). Such a DCC 31 is not required for protection switching purposes (rerouting of traffic in the event of a fault) in accordance with this invention as described below, but may optionally be provided for desired switching of signals for other purposes. Accordingly, any such DCC does not require the same spare capacity for protection switching as in the prior art of FIG. 1, and can be very much smaller, less costly, and easier to control. The presence or absence in each node of the DCC has no affect on the protection switching operations of this invention as described below.

It is observed that, although the modified node is shown in FIG. 2 and described above as including the wavelength detectors 27 and 28, in different embodiments of the invention either or both of these detectors may be omitted. Furthermore, although as shown in FIG. 2 and described above the modified node includes the optical amplifier 21, in different embodiments of the invention, and in different nodes of a single communication system, the optical amplifier may be replaced by an optical regenerator between the OCC ports A1 and A2 or by a simple optical fiber connection between these ports, depending on optical fiber signal attenuation and degradation factors which are well known in the art. These variations are described in more detail later below.

Figure 3:
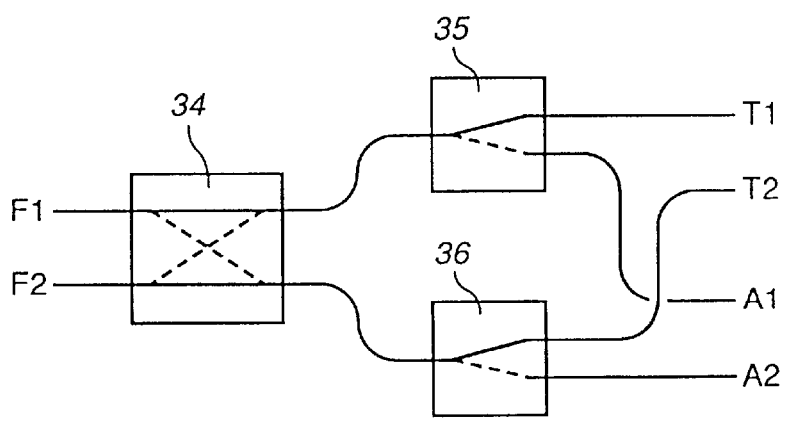
FIG. 3 illustrates one form of an optical cross connect (OCC) in the node of FIG. 2.
Figure 4:
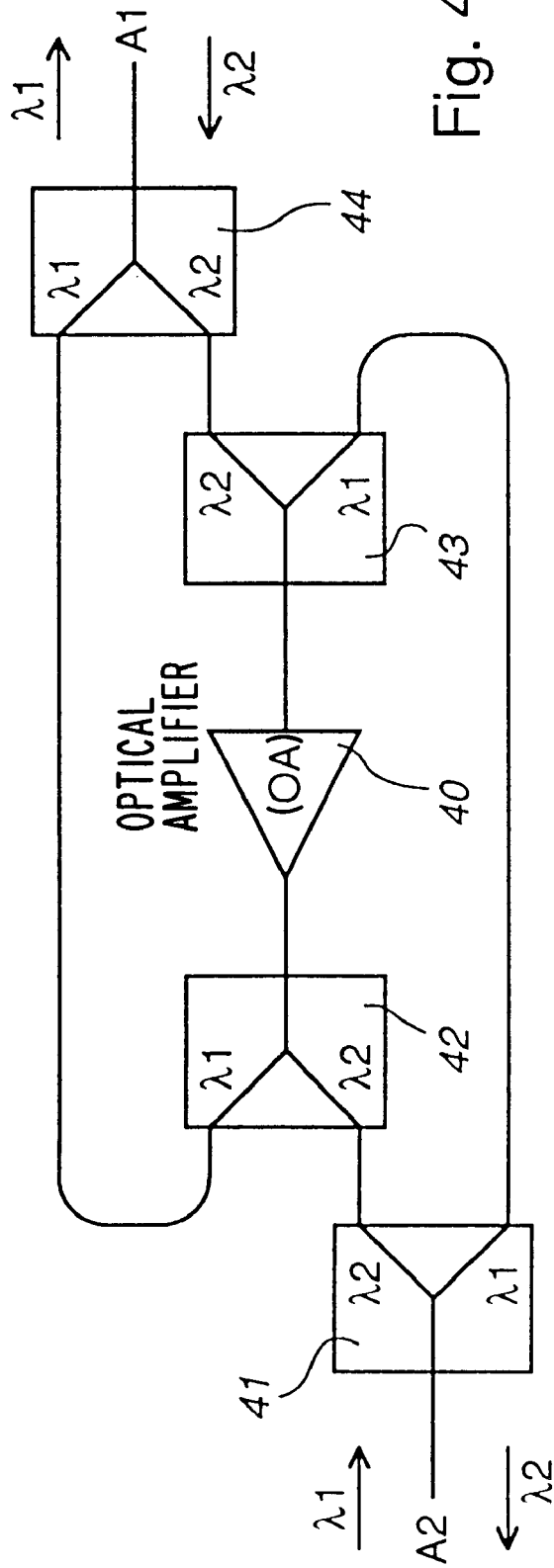
FIG. 4 illustrates one form of an optical amplifier (OA) in the node of FIG. 2.

FIG. 3 illustrates a convenient form of the OCC 20, comprising three optical switches 34, 35, and 36. The optical switches can comprise any desired form, for example being optomechanical devices in which prisms are moved, or being thermo-optic devices in which the refractive index of a polymer is changed by controlling its temperature, in each case to switch optical signals passing through the devices in accordance with electrical control signals which are not represented in FIG. 3.

FIG. 3 shows optical paths through the switches 34 to 36, solid lines indicating optical paths in normal (fault-free) situations and broken lines indicating optical paths in protection switched conditions as described further below. The switch 34 is a 2-port, 2-way or changeover switch, and each of the switches 35 and 36 is a 1-port, 2-way switch. The two inputs of the switch 34 are coupled via optical fibers to the OCC ports F1 and F2, the two outputs of the switch 34 are coupled via optical fibers each to the input of a respective one of the switches 35 and 36, the "normal path" switch outputs of the switches 35 and 36 are coupled via optical fibers to the OCC ports T1 and T2 respectively, and the "switched path" outputs of the switches 35 and 36 are coupled via optical fibers to the OCC ports A1 and A2 respectively. The following table lists three alternative states of the OCC 20, identified as normal, adjacent node protection, and far node protection states, indicating the states of the optical switches 34 to 36 and the resulting couplings of the OCC ports:

| OCC state | Switch 34 | Switch 35 | Switch 36 | Couplings | |
|---|---|---|---|---|---|
| Normal | Normal | Normal | Normal | F1-T1 | F2-T2 |
| Adjacent node protection | Switched | Normal | Normal | F1-T2 | F2-T1 |
| Far node protection | Normal | Switched | Switched | F1-A1 | F2-A2 |

FIG. 4 illustrates one form of the bidirectional optical amplifier (OA) 21, which comprises an optical amplifier (OA) 40 and four wavelength division multiplex (WDM) signal couplers 41 to 44 each having a port for the wavelength $\lambda 1$, a port for the wavelength $\lambda 2$, and a port which is common to the two wavelengths. These units are coupled via optical fibers between the ports A1 and A2 of the OCC 20 as shown in FIG. 4. In consequence, an optical signal at the wavelength $\lambda 1$ incoming at the port A2 is supplied via the common and $\lambda 1$ ports of the couplers 41 and 43 to the input of the OA 40, and an amplified signal at this wavelength is supplied from the output of the OA 40 to the port A1 via the common and $\lambda 1$ ports of the couplers 42 and 44. In addition, an optical signal at the wavelength $\lambda 2$ incoming at the port A1 is supplied via the common and $\lambda 2$ ports of the couplers 44 and 43 to the input of the OA 40, and an amplified signal at this wavelength is supplied from the output of the OA 40 to the port A2 via the common and $\lambda 2$ ports of the couplers 42 and 41. The OA 40 thus amplifies bidirectional optical signals at the two wavelengths.

Figure 5:
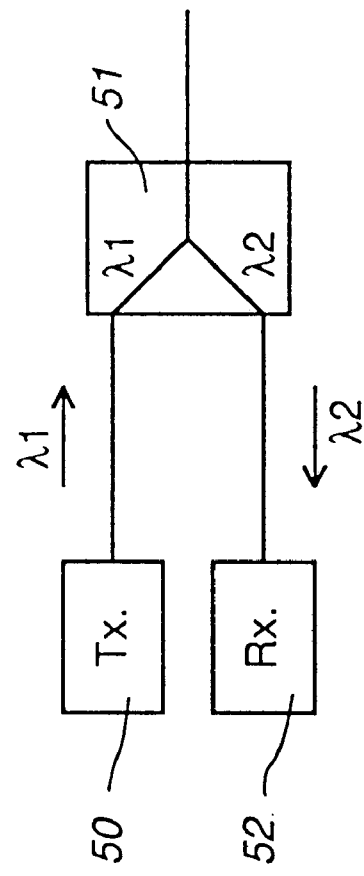
FIG. 5 illustrates one form of optical coupling to a transmitter and receiver in the node of FIG. 2.

FIG. 5 illustrates optical coupling to a transmitter (Tx.) and a receiver (Rx.) in a terminal T of a node. As illustrated, a transmitter 50 transmits an optical signal at the wavelength $\lambda 1$ to the $\lambda 1$ port of a WDM coupler 51, and a receiver 52 receives an optical signal at the wavelength $\lambda 2$ from the $\lambda 2$ port of the coupler 51. Bidirectional optical signals at the respective wavelengths are communicated via the common port of the coupler 51. A converse arrangement can be provided for transmitting an optical signal at the wavelength $\lambda 2$ and receiving an optical signal at the wavelength $\lambda 1$.

Figure 6:
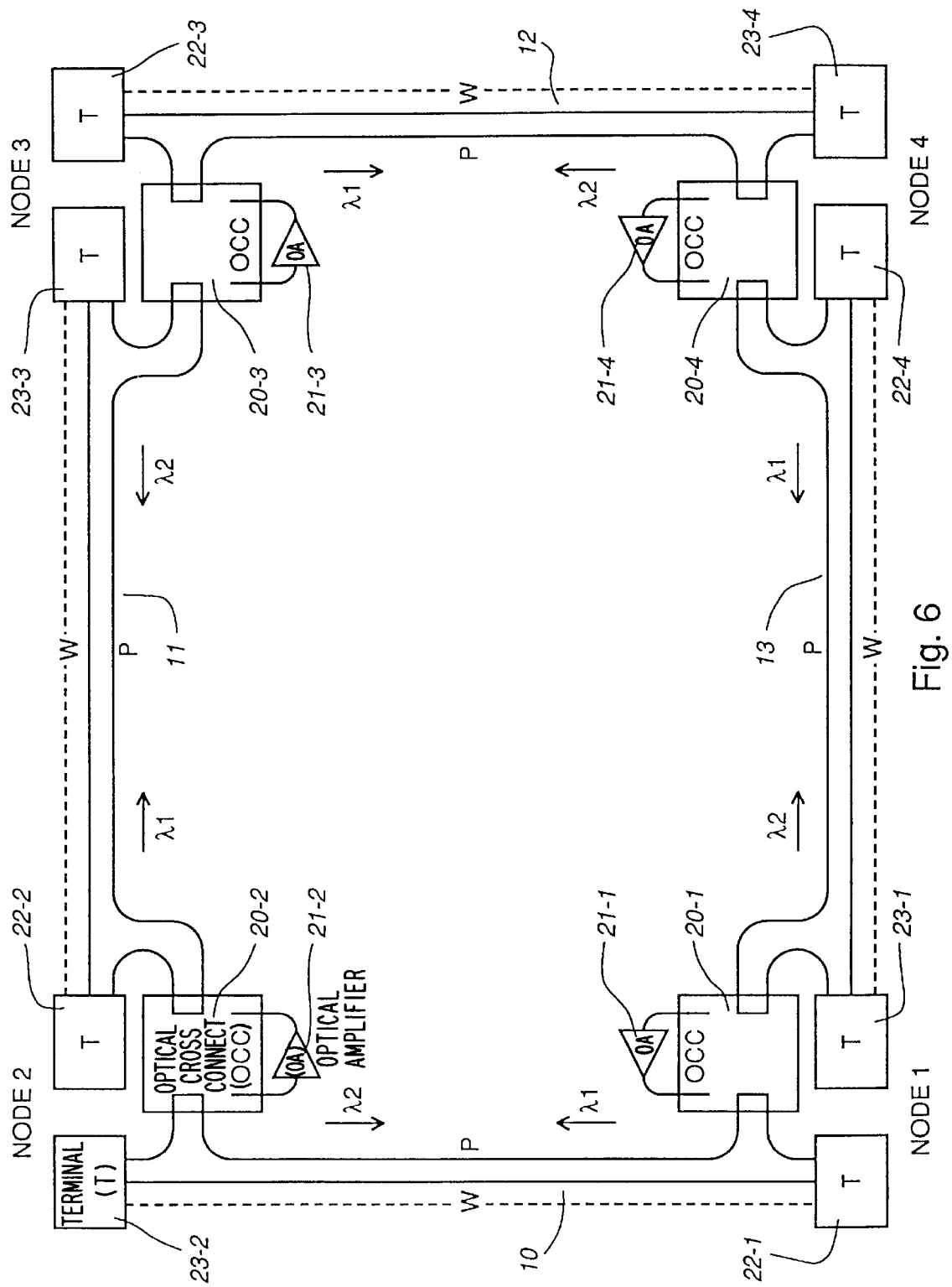
FIG. 6 illustrates, in a simplified manner, the communication system of FIG. 1 modified in accordance with the invention, each node being as described with reference to FIGS. 2 to 5 and the system being shown in normal operation.

FIG. 6 illustrates the communication system of FIG. 1 modified with nodes as described with reference to FIGS. 2 to 5, the system being shown in normal operation. For simplicity and clarity, FIG. 6 does not illustrate the OCC control unit 26, wavelength detectors 27 and 28, and any DCC 31 in each node. For identifying components in the different nodes, each reference is supplemented by a hyphen followed by the node number. Thus for example 22-1 identifies the terminal 22, which transmits at the wavelength $\lambda 1$ and receives at the wavelength $\lambda 2$, in the node 1.

As shown in FIG. 6, all of the OCCs 20 are in the normal state in which the ports F1 and T1 are coupled together and the ports F2 and T2 are coupled together. Thus the protection channel ports of the terminals T are coupled via the OCCs 20 to the optical fiber protection channels P, in a similar manner to that of FIG. 1, except in respect of the directions in which the two wavelengths $\lambda 1$ and $\lambda 2$ of optical signal are transmitted. Thus whereas in the prior art system of FIG. 1 these wavelengths can be used arbitrarily for the opposite directions of transmission on each communication link, as described above, in each node of the system of FIG. 6 each node transmits using the wavelength $\lambda 1$, and receives using the wavelength $\lambda 2$, in the terminal 22 and transmits using the wavelength λ2, and receives using the wavelength λ1, in the other terminal 23. Consequently, the arrangement of the terminals 22 and 23, and the directions of optical signals having the wavelengths λ1 and λ2, are changed to be as illustrated in FIG. 6. Although the communication links 10 to 13 are still separate and independent links, the protection channel fibers of these links can now be coupled optically in a ring for protection purposes as described below.

It is noted here that the directions of the wavelengths λ1 and λ2 as illustrated in FIG. 6 and discussed here refer to the wavelengths of optical signals on the protection channel fiber. For consistency and convenience, the directions of the wavelengths λ1 and λ2 on each working channel fiber can be the same as on the protection channel, but this need not necessarily be the case and the invention is not limited in this respect. As far as this embodiment of the invention is concerned, arbitrary choices can be made as to which wavelength is used for each direction of transmission on each working channel of each communication link. As can be seen from the drawings and the above description, the working channel fibers are not coupled to the OCCs 20, and the working channels W can be operated exactly as in the prior art.

The normal operating state shown in FIG. 6 will persist while there is no fault. As can be seen from a consideration of FIGS. 2 and 6, for example in the node 1 the wavelength λ1 is received on the protection channel P of the communication link 13 from the node 4 and is supplied via the fiber 25 and the OCC coupling F1-T1 to the terminal 23, which transmits the wavelength λ2 in the opposite direction. As a result of the directional coupling at 30, only the received optical signal at the wavelength λ1 is supplied to the wavelength detector 28, which accordingly does not produce any output signal. Conversely, in the node 1 the wavelength λ2 is received on the protection channel P of the communication link 10 from the node 2 and is supplied via the fiber 24 and the OCC coupling F2-T2 to the terminal 22, which transmits the wavelength λ1 in the opposite direction. As a result of the directional coupling at 29, only the received optical signal at the wavelength λ2 is supplied to the wavelength detector 27, which accordingly does not produce any output signal. In the absence of any output signal from the wavelength detectors 27 and 28, and in the absence of any alarm signal from the terminals 22 and 23, in each node the OCC control unit 26 maintains the normal state of the OCC 20 as shown in FIG. 6.

Figure 7:
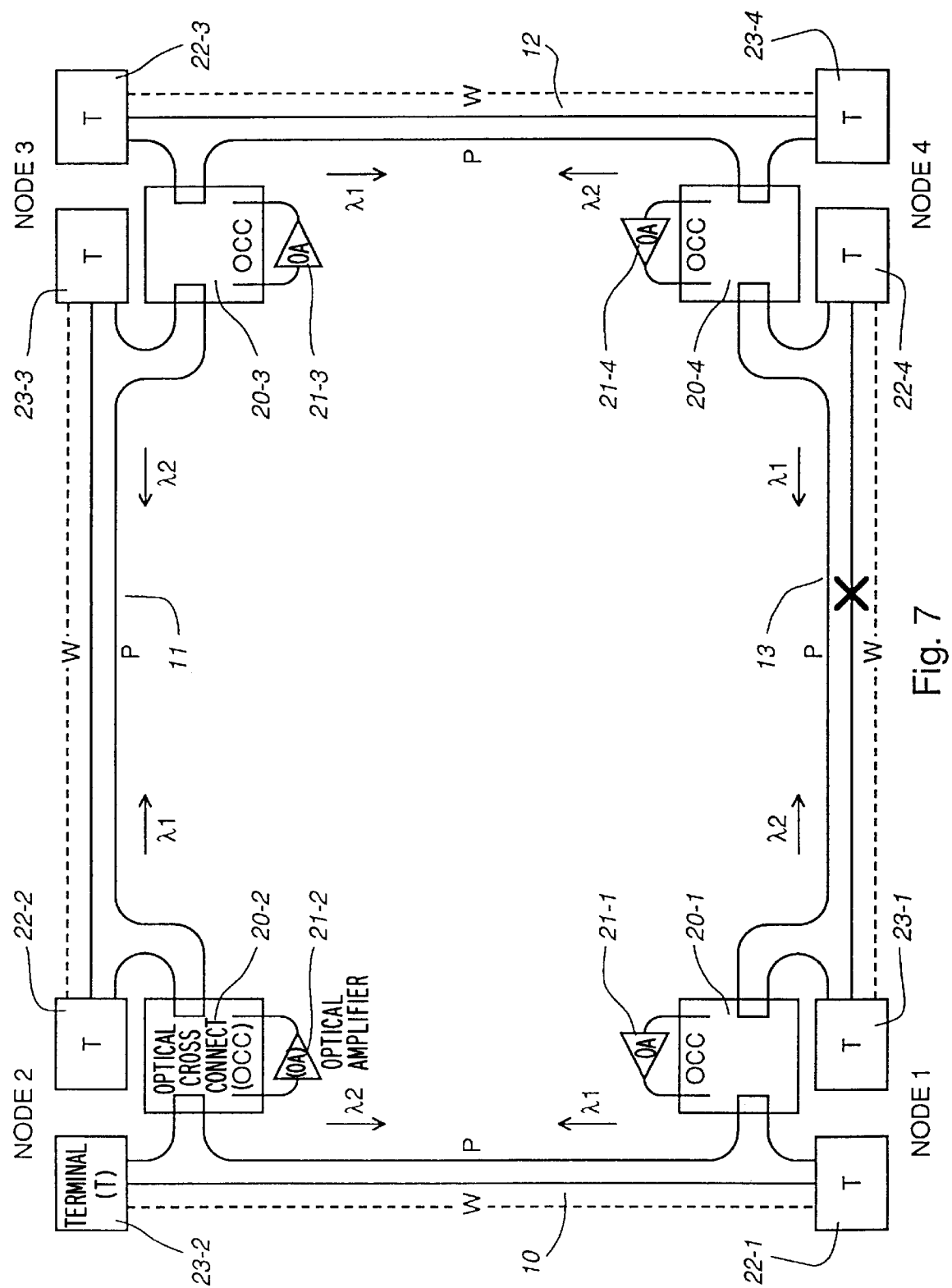
FIG. 7 illustrates, in a similar manner, the communication system in a protection state after a span failure.
Figure 8:
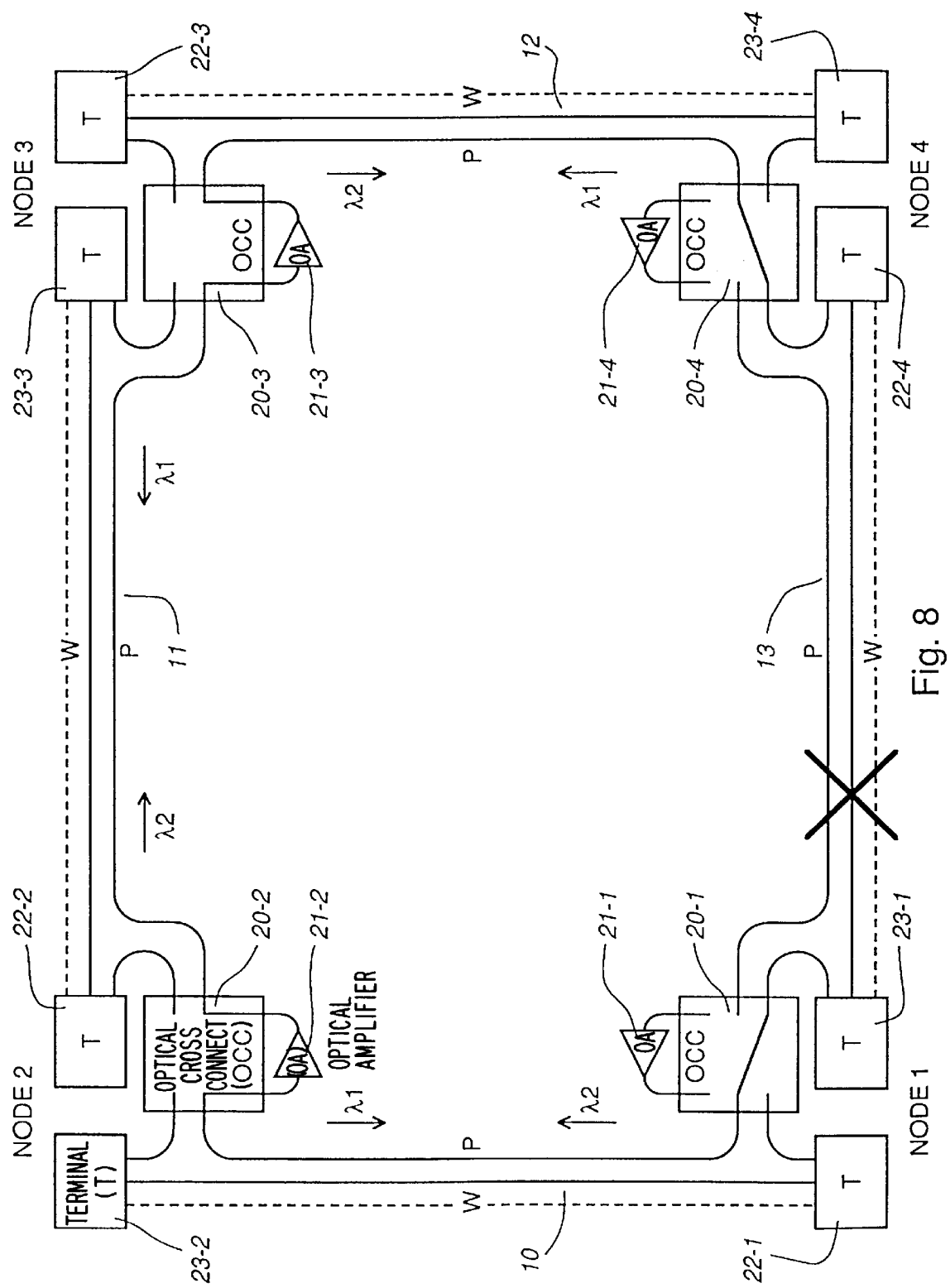
FIG. 8 illustrates, in a similar manner, the communication system in a protection state after a link failure.
Figure 9:
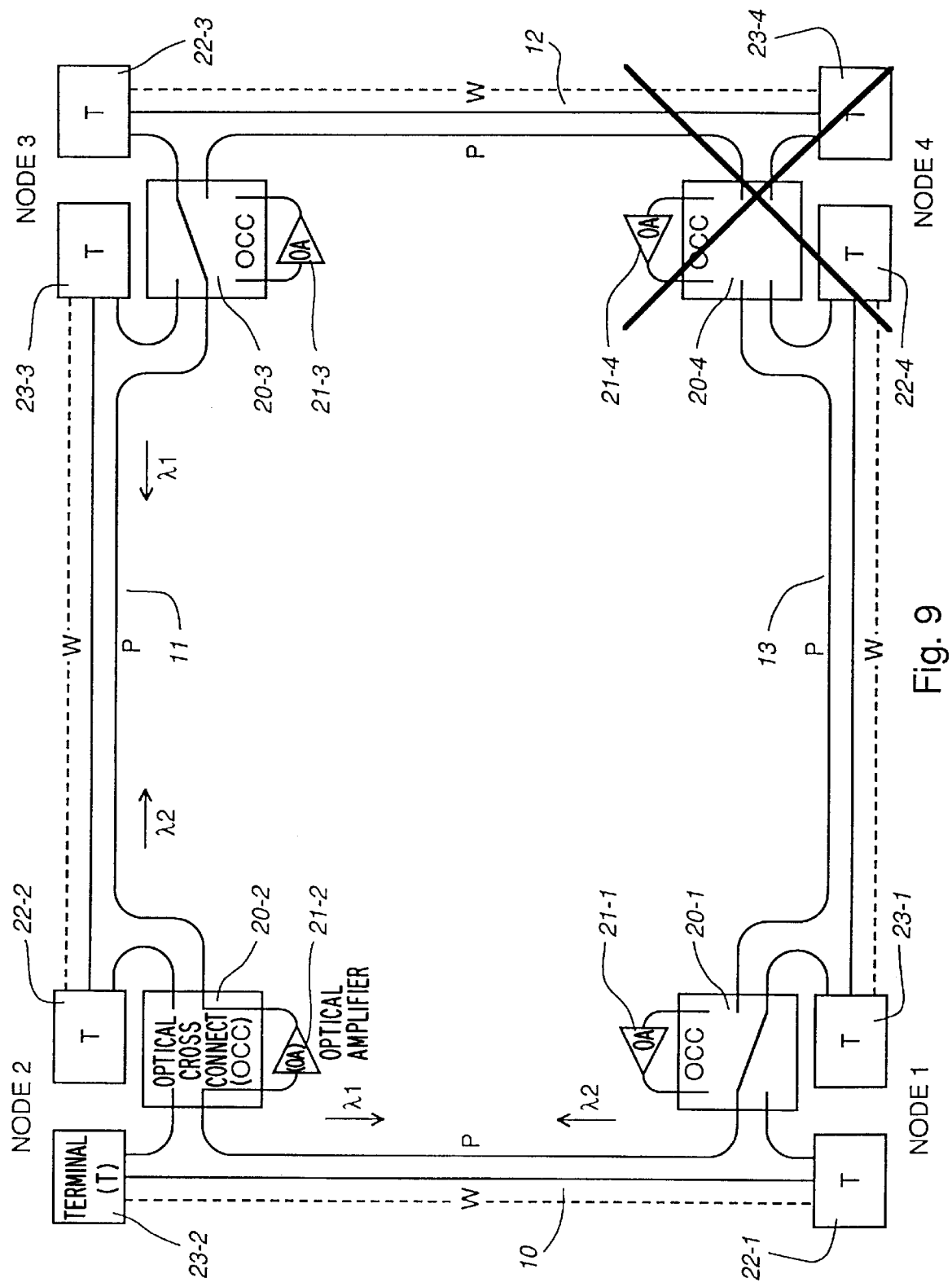
FIG. 9 illustrates, in a similar manner, the communication system in a protection state after a node failure.

FIGS. 7, 8, and 9 illustrate the same communication system as FIG. 6 in various different protection states following respectively a span failure, a link failure, and a node failure. In each case the failure is represented by a bold X.

FIG. 7 represents a span failure, i.e. a failure of a working channel, in the communication link 13 between the nodes 1 and 4. For example, this may arise from a failure of an optical transmitter or receiver associated with the working channel. Such a failure is detected within the terminals 23-1 and 22-4 and traffic on the failed working channel is protected by switching it within these terminals onto the protection channel P, preempting any (lower priority) traffic which may have been carried on the protection channel. On correction of the fault, the normal state shown in FIG. 6 is returned to. As this protection switching and return to the normal state are well known in the art, no further description of them is required here. It is observed that the OCCs 20 are not involved in this process, and that similar protection switching can take place independently and simultaneously on any of the communication links 10 to 13.

FIG. 8 represents a protection state of the system after a link failure, for example a cable cut interrupting all of the optical fibers, of the communication link 13 between the nodes 1 and 4. This state is reached from the normal state of FIG. 6 in the following manner:

Initially, the terminals 23-1 and 22-4 in the nodes 1 and 4 adjacent (i.e. closest on each side of) the fault detect a loss of the signal received from the working channel W (or the highest priority working channel if there is more than one) of the communication link 13, and perform a protection switch of the traffic from this working channel to the protection channel P on this communication link 13 as described above with respect to FIG. 7. This protection switch fails to restore the traffic, producing an alarm signal from the receivers in these terminals. (Alternatively, such an alarm signal can be produced by the receivers in these terminals detecting a loss of signal on all of the channels of the communication link 13, the protection switch still being performed.) The alarm signal produced at the terminal 23-1 is supplied to the OCC control unit 26-1 in the node 1, and the alarm signal produced at the terminal 22-4 is supplied to the OCC control unit 26-4 in the node 4, and the control units 26 control the OCCs 20-1 and 20-4 each to switch to the adjacent node protection state in which the couplings F1-T1 and F2-T2 are changed over to F1-T2 and F2-T1. For clarity, FIG. 8 shows only the F2-T1 coupling for the OCC 20-1, and shows only the F1-T2 coupling for the OCC 20-4, because only these couplings are necessary for the protection switching process. The other couplings are simultaneously provided using the form of OCC 20 described above with reference to FIG. 3, or alternatively need not be provided if a different form of OCC 20 is used.

As a result of the change of state of the OCC 20-1, the protection channel P of the communication link 10 now carries an optical signal at the wavelength λ2 transmitted by the terminal 23-1, instead of at the wavelength λ1 transmitted by the terminal 22-1. In the node 2, this optical signal is coupled via the directional coupling 30 to the λ2 wavelength detector 28, which consequently detects this wavelength and supplies an electrical signal to the OCC control unit 26 in the node 2. This causes the OCC 20-2 to switch to the far node protection state as shown in FIG. 8, whereby the protection channel P of the communication link 10 is coupled through the OCC coupling F1-A1, the OA 21-2, and the OCC coupling F2-A2 to the protection channel P of the communication link 11.

Consequently, the protection channel P of the communication link 11 now carries an optical signal at the wavelength λ2 transmitted by the terminal 23-1, instead of at the wavelength λ1 transmitted by the terminal 22-2. In the node 3, this optical signal is coupled to and detected by the detector 28 in a similar manner to that described above for the node 2, causing the OCC 20-3 also to switch (if it has not already done so as described in the next paragraph) to the far node protection state as shown in FIG. 8. The same applies to any intermediate nodes (not shown) which may be present in the communication system.

It can be seen that, as a result of the change of state of the OCC 20-4, the protection channel P of the communication link 12 carries an optical signal at the wavelength λ1 transmitted by the terminal 22-4, instead of at the wavelength λ2 transmitted by the terminal 23-4. In the node 3, this optical signal is coupled via the directional coupling 29 to the λ1 wavelength detector 27, which detects this wavelength and supplies an electrical signal to the OCC control unit 26 in the node 3 to cause the OCC 20-3 to switch more immediately to the far node protection state as shown in FIG. 8.

In any event, it can be seen that an optical signal from the transmitter in the terminal 23-1 at the wavelength λ2 is propagated clockwise around the protection channel P looped through the OCCs 20 in the far nodes (i.e. the nodes not adjacent the fault) 2 and 3, and an optical signal from the transmitter in the terminal 22-4 at the wavelength λ1 is propagated counter-clockwise around the protection channel P looped through the OCCs 20 in the far nodes 2 and 3, whereby the protection switched traffic from the (highest priority) working channel W interrupted by the fault on the communication link 13 is communicated between the nodes 1 and 4 via the remainder of an optical ring now formed by the interconnected protection channels P on the other communication links 10 to 12.

The speed of the protection switching as described above is maximized by providing both of the λ1 and λ2 wavelength detectors 27 and 28 in each of the nodes. A slightly slower speed of protection switching is achieved if only one wavelength detector, e.g. the detector 28, is provided in each node. However, the protection switching still takes place without any wavelength detectors. In this case, in each far node, e.g. the nodes 2 and 3 as described above, there is a loss of the received optical signal from the protection channel in the respective terminal, resulting in an alarm signal which is also communicated to the OCC control unit 26 of the node as shown in FIG. 2 and which causes the OCC 20 to switch to the far node protection state if it has not already done so.

For example, as described above the change of state of the OCC 20-4 causes the protection channel P of the communication link 12 to carry an optical signal at the wavelength λ1 transmitted by the terminal 22-4, instead of at the wavelength λ2 transmitted by the terminal 23-4. The receiver 52 (FIG. 5) of the terminal 22-3 in the node 3 therefore no longer receives any optical signal, the signal at the wavelength λ1 being blocked from the receiver by the coupler 51, and produces an alarm signal which is supplied to the OCC control unit 26 in the node 3 to cause the OCC 20-3 to switch to the far node protection state as shown in FIG. 8. Thus the presence of the wavelength detectors 27 and 28 is optional, but is preferred for rapid protection switching.

It can be seen that the protection switching as described above and illustrated in FIG. 8 is effective for only one working channel at a time, and preempts any low priority traffic which can otherwise be carried by the protection channels on the communication links 10 to 13. This is consistent with the provision, purpose, and implementation of existing protection channels. It can also be seen from FIG. 8 that in the protection state the optical amplifiers 21 serve to amplify the optical signals on the protection channel as they are coupled through the nodes from one communication link to another. The need for the optical amplifiers, or their possible replacement by regenerators or direct optical fiber couplings, is determined primarily by the optical signal path lengths which are created on the looped protection channel path, and the resulting optical signal attenuation or degradation, and clearly can be different for different ones of the nodes 1 to 4.

On rectification of the link failure fault as shown in FIG. 8, the communication system returns to the normal state in the following manner:

Initially, optical signals on the working channel(s) W of the previously failed communication link 13 are detected by the receivers in the terminals 23-1 and 22-4 of the adjacent nodes 1 and 4. The terminals 23-1 and 22-4 terminate the protection switch in conventional manner, and terminate the corresponding alarm signals supplied to the OCC control units 26 thereby causing the OCCs 20-1 and 20-4 to return to their normal states as shown in FIG. 6. The receivers in the terminals 23-1 and 22-4 then also detect the optical signals on the protection channel P of the communication link 13.

As a result of the change of state of the OCC 20-1, the protection channel P of the communication link 10 no longer carries an optical signal at the wavelength λ2 to the node 2. The λ2 wavelength detector 28 in the node 2 consequently no longer produces an output signal, thereby causing the OCC 20-2 to switch to the normal state as shown in FIG. 6. As a result, the protection channel P of the communication link 11 also no longer carries an optical signal at the wavelength λ2, and in the node 3, this signal is no longer detected by the detector 28 so that similarly the OCC 20-3 also switches (if it has not already done so as described below) to the normal state as shown in FIG. 6. The same applies to any intermediate nodes (not shown) which may be present in the communication system, a return to the normal state of the OCCs 20 in the far nodes is propagated in the clockwise direction around the protection ring. Likewise, the detectors 27 in these far nodes detect the loss of the optical signal at the wavelength λ1 from the protection channel optical fibers coupled to them, and propagate a return to the normal state of the OCCs 20 in the counter-clockwise direction around the protection ring.

As in the case of protection switching, the return to the normal state of FIG. 6 is most rapid when each node includes both of the wavelength detectors 27 and 28, but either of these may be omitted. In the event that both wavelength detectors are not provided in a far node, then the loss of the optical signal in the respective direction on the protection channel P at the wavelength λ1 and/or λ2 is detected in the optical amplifier 21 and a resulting signal is supplied to the OCC control unit 26 to cause the OCC 20 to return to the normal state. In the event that the optical amplifier 21 is replaced by a regenerator as discussed above, then a corresponding optical signal loss detection signal is available from the regenerator.

Alternatively, a "return-to-normal" control signal can be communicated from the adjacent node 1 and/or 4 to the far nodes 2 and 3 via overhead (e.g. user-defined alarm) signals on the working channel(s), in response to which the OCC control unit 26 in each far node causes the OCC 20 to return to the normal state. However, this is not preferred because it involves interfaces to the terminals T. Likewise it is possible, but not preferred, to communicate a "protection" control signal in the working channel overhead signals from the adjacent nodes to the far nodes in order to effect a protection switch from the normal state in FIG. 6 to the protection state of FIG. 8. The use of one or both of the wavelength detectors 27 and 28 in each node as described above is preferred because it provides faster switching between the normal and protection states, and because it is independent of the design of individual manufacturers' equipment.

FIG. 9 represents a protection state of the system after a node failure, for example of the node 4. Protection switching to this state from the normal state of FIG. 6, and the return to the normal state in FIG. 6 on rectification of the node failure, is effected in substantially the same manner as described above for the link failure case of FIG. 8, the only significant difference being that the nodes 1 and 3 in FIG. 9 are the nodes adjacent the fault and only the node 2 is a far node.

In addition, in the protection state after a node failure as shown in FIG. 9, it is desirable or necessary to prohibit traffic for the failed node from being communicated to other nodes for which the traffic is not intended. For example, in the case of failure of the node 4 as shown in FIG. 9, in the protection state traffic from the node 1 and intended for the node 4 could be routed to the node 3, where it would be superfluous and ignored. In order to avoid such unnecessary routing of traffic, channel and system identities carried by the optical signals can be monitored in the nodes and used to prohibit traffic destined for a failed node, or a similar function can be performed by a network management system.

Figure 10:
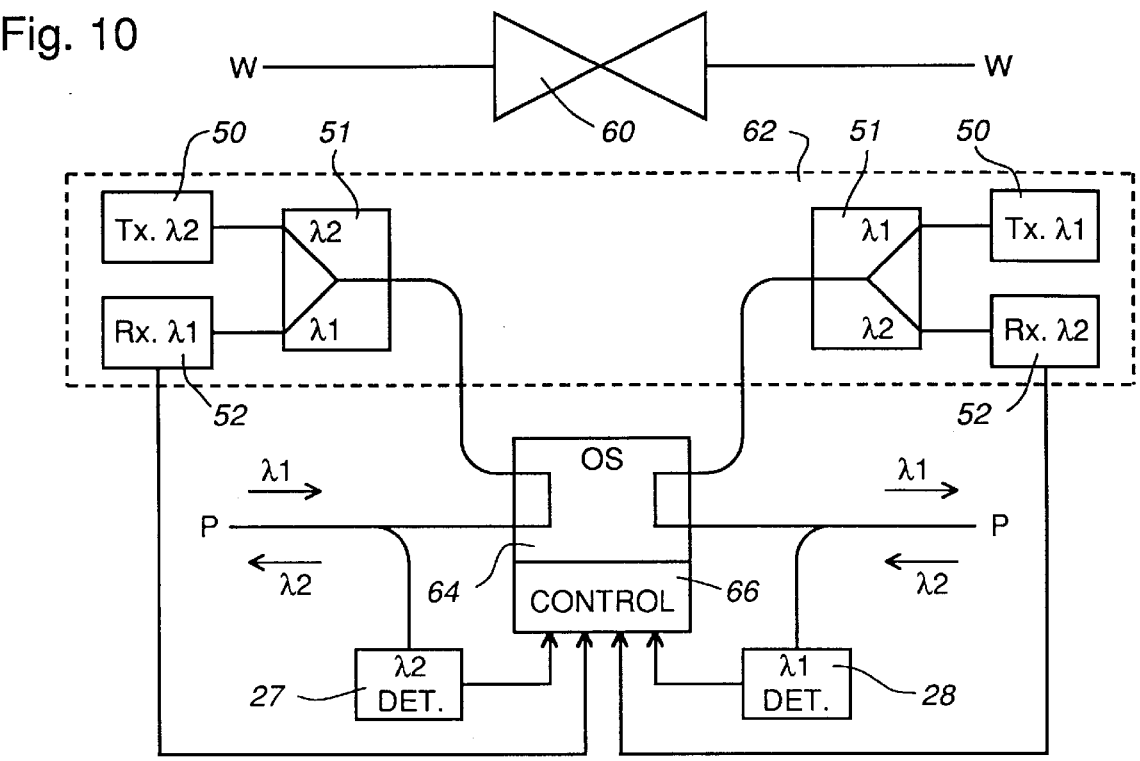
FIG. 10 illustrates a regenerator arrangement which may be used in the communication system, showing OCC connections in normal operation.
Figure 11:
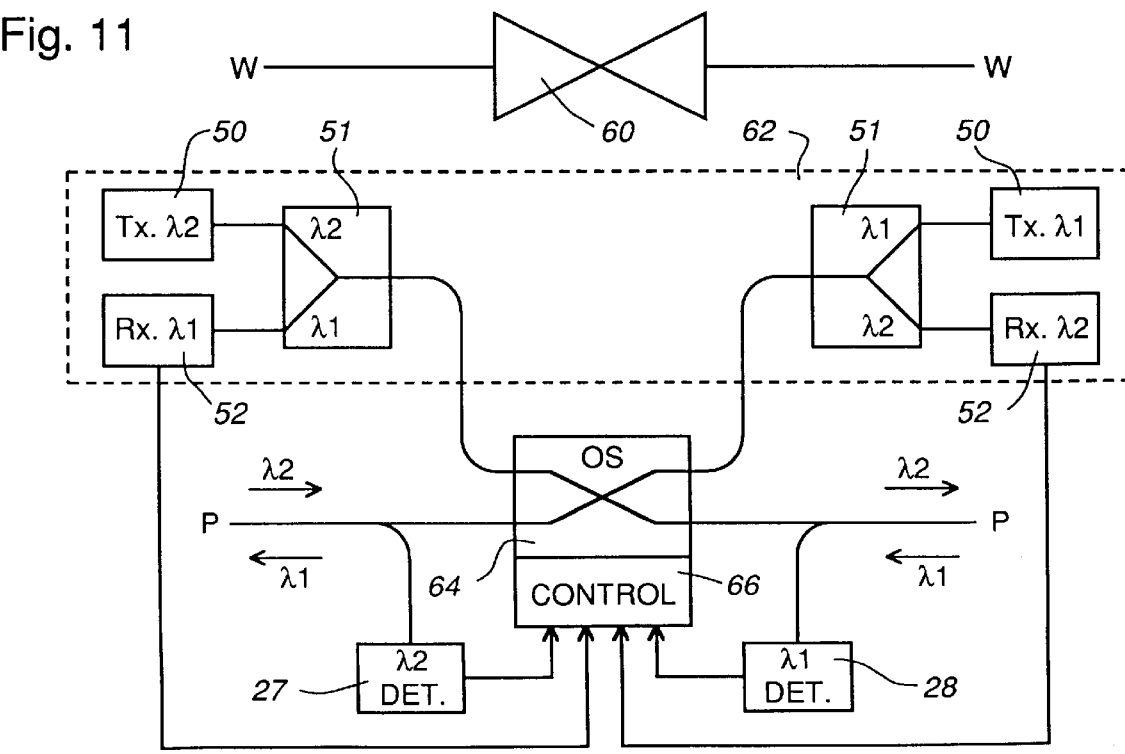
FIG. 11 illustrates the regenerator arrangement with the OCC connections in a protection state after a link failure.

As is well known, any of the communication links 10 to 13 may also include one or more bidirectional regenerators. FIGS. 10 and 11 each illustrate, for example for the communication link 11 between the nodes 2 and 3, schematically a regenerator 60 for one working channel W optical fiber, and in more detail within a dashed line box a regenerator 62 provided for the protection channel P optical fiber. Each regenerator comprises, as shown for the regenerator 62, two units each comprising a transmitter 50, a WDM coupler 51, and a receiver 52 arranged as described above with reference to FIG. 5, one unit serving for transmission at the wavelength λ1 and reception at the wavelength λ2, and the other unit serving for transmission at the wavelength λ2 and reception at the wavelength λ1. The regenerator 60 is coupled to the working channel fiber in conventional manner. The regenerator 62 is coupled to the protection channel fiber via a 2-port 2-way optical switch (OS) 64 having a control unit 66 which is controlled by alarm signals from the receivers 52 and/or by λ1 and λ2 wavelength detectors 27 and 28 which are directionally coupled to the protection channel fiber, in a similar manner to that described above for the OCC control unit 26 in each node.

FIG. 10 illustrates the OS 64 in the normal state, and FIG. 11 illustrates the OS 64 in the protection switched state. In each case the oppositely directed signal wavelengths λ1 and λ2 on the protection channel are coupled to the appropriate units of the regenerator 62, via either the normal connections of the OS 64 as shown in FIG. 10 or the crossed connections of the OS 64 as shown in FIG. 11. Switching between the two states is controlled by the control unit 66 in dependence upon optical signal loss detection signals from the receivers and/or wavelength detection signals from the detectors 27 and 28 in a similar manner to that described above. Again, either or both of the wavelength detectors 27 and 28 may be dispensed with as described above.

The OCC control unit 26 in each node and the OS control unit 66 in each regenerator can comprise logic circuits which are responsive to the alarm signals and/or wavelength detector signals supplied thereto to control the OCC 20 and OS 64, respectively, in the manner described above. Such logic circuits can easily be provided by persons of ordinary skill in the art, and accordingly need not be further described here.

It can be appreciated from the above description that the invention provides several important commercial and technical advantages. In particular, it provides a protection arrangement which can be incorporated in new communication systems and can be easily added to existing communication systems using groups of linear or point-to-point communication links, regardless of their use of synchronous or asynchronous communication, or both, regardless of their ratios of protection channels to working channels, and regardless of their transmission rates. It thus also permits easy upgrading of the communication links, in that the use of higher bit rates on the communication links requires no change of the protection system components. In other words, the protection arrangement provides the advantages of switching optical signals, the transmission rate of which does not affect the protection switching. At the same time, the protection arrangement uses a small number of small optical switches, such as 1- or 2-port 2-way switches as described above, thereby avoiding the disadvantages (especially cost and unreliability) of large optical switches which have hitherto been considered necessary for protection purposes. Furthermore, the OCC and OS are provided only in the protection channel, so that the reliability of communication of the working channel traffic is not adversely affected by the protection arrangement.

Although particular embodiments of the invention have been described in detail above, it should be appreciated that numerous modifications, variations, and adaptations may be made without departing from the scope of the invention. For example, it can be appreciated that although the above description refers only to the use of one wavelength in each direction on each fiber, WDM may be used to permit each optical fiber to carry optical signals at two or more wavelengths in each direction of transmission. In addition, one wavelength in each direction on the protection channel optical fibers may be used to provide protection for any one of two or more WDM wavelengths in each direction on one or more working channel optical fibers.

Although the above description relates to a communication system having four nodes, the invention is applicable to communication systems having two or more nodes with communication links forming a ring. Furthermore, more complex networks may comprise many nodes and communication links forming two or more communication systems in accordance with this invention, with the rings of such systems possibly intersecting and/or overlapping one another.

In addition, as already indicated the invention can also be applied to communication systems in which different optical fibers are used for opposite directions of transmission, rather than different wavelengths on the same fiber. In this case each OCC 20, OS 64, and OA 21 as described above can be duplicated for the two different fibers or directions of transmission, the WDM couplers being dispensed with and the wavelength detectors being replaced by optical signal detectors.

We claim:

1. An optical communication system comprising:

a plurality of nodes each comprising two terminals, and a plurality of optical communication links each providing bidirectional communications between a respective pair of terminals in two different nodes, each communication link comprising at least one working channel for normal traffic and a protection channel to which the terminals are arranged to switch the normal traffic of a faulty working channel;

wherein each node includes an optical switch via which the protection channels, but not the working channels, are coupled to the respective terminals in normal operation, the optical switches being arranged and controlled so that, in the event that normal traffic of a faulty working channel of a communication link between two terminals is not restored by a switch to the protection channel of that communication link, the normal traffic is communicated between the two terminals via the optical switches and the protection channels of the other communication links.

2. A system as claimed in claim 1 wherein the protection channel of each communication link comprises an optical fiber using two different wavelengths for the two directions of transmission on the channel, a first one of the wavelengths being used in normal operation for transmission in a direction on each protection channel fiber corresponding to a clockwise direction around the ring, and a second one of the wavelengths being used in normal operation for transmission in a direction on each protection channel fiber corresponding to a counter-clockwise direction around the ring.

3. A system as claimed in claim 2 wherein at least one node includes a wavelength detector directionally coupled to the protection channel fiber for detecting an optical signal at at least one of the two wavelengths and providing a control signal for the optical switch of the node.

4. A system as claimed in claim 1 wherein the terminals are arranged to communicate at different transmission speeds on at least two of the communication links.

5. A system as claimed in claim 1 wherein at least one of the pairs of terminals is arranged to communicate synchronous signals and at least another of the pairs of terminals is arranged to communicate asynchronous signals.

6. A system as claimed in claim 1 wherein at least two of the communication links have different numbers of working channels.

7. A node for an optical communications system, the node comprising:
  first and second terminals for coupling respectively to first and second bidirectional optical communication links each comprising at least one working channel for normal traffic and a protection channel to which the terminal is arranged to switch the normal traffic of a faulty working channel;
  an optical switch having optical ports T1 and T2 coupled respectively to protection channel optical ports of the first and second terminals and having optical ports F1 and F2 for coupling respectively to the protection channel of the first and second communication links; and
  a control unit for controlling the optical switch so that in normal operation the ports F1 and T1 are coupled together and the ports F2 and T2 are coupled together, in a first protection state the ports F1 and T2 and/or the ports F2 and T1 are coupled together, and in a second protection state there is a coupling between the ports F1 and F2.

8. A node as claimed in claim 7 wherein the control unit is responsive to an alarm signal from the first or second terminal, representing a failure of a protection switch at the terminal to restore traffic from a faulty working channel via the protection channel of the respective communication link, to establish the first protection state.

9. A node as claimed in claim 7 wherein the control unit is responsive to a loss of an optical signal received by the first or second terminal via the protection channel of the respective communication link to establish the second protection state.

10. A node as claimed in claim 7 wherein the first terminal transmits and receives optical signals via its protection channel optical ports at first and second wavelengths respectively, the second terminal transmits and receives optical signals via its protection channel optical ports at the second and first wavelengths respectively, and the node includes at least one detector directionally coupled to the protection channel of at least one of the first and second communication links for detecting optical signals at the first or second wavelength, the control unit being responsive to the detector for controlling the optical switch.

11. A node as claimed in claim 7 and including a bidirectional optical amplifier or regenerator via which the ports F1 and F2 are coupled in the second protection state.

12. A method of protecting a plurality of separate bidirectional optical communication links, each communication link comprising at least one working channel for normal traffic between a pair of terminals and a protection channel to which the terminals are arranged to switch the normal traffic of a working channel in the event of a fault on the working channel, comprising the steps of:
  at each of a plurality of nodes, each comprising two of said terminals associated with two separate communication links whereby the plurality of nodes and communication links form a ring, providing an optical switch arranged in normal operation to couple the protection channel of the two communication links to protection channel ports of the respective terminals; and
  (i) at at least one of the plurality of nodes, in the event that a protection switch, at one of the two terminals of the node, of normal traffic from a faulty working channel of the associated communication link to the protection channel of the communication link fails to restore the normal traffic, controlling the optical switch to couple the protection channel port of this one of the two terminals to the protection channel of the communication link associated with the other of the two terminals of the node; and
  (ii) at at least one other node in consequence of the coupling in (i), controlling the optical switch of this other node to provide a coupling between the protection channels of the two communication links at this other node.

13. A method as claimed in claim 12 wherein step (i) is carried out at each of two nodes adjacent to a fault resulting in a protection switch at each of said nodes to the protection channel of the communication link between said two nodes and failure of the protection switch to restore the normal traffic between said two nodes, and step (ii) is carried out at each other node.

14. A method as claimed in claim 13 wherein step (ii) comprises the step of, at at least one node, regenerating or amplifying optical signals coupled between the protection channels of the two communication links at the respective node.

15. A method as claimed in claim 13 wherein step (ii) is carried out at each other node in dependence upon an optical signal on the protection channel of a communication link associated with a terminal of the respective node.

16. A communications system comprising a plurality of separate communication links each between two terminals at respective nodes, each node comprising two terminals associated with different communication links, each communication link comprising at least one working channel for normal traffic and a protection channel for communicating the normal traffic of a faulty working channel of the respective communication link in the event of a protection switch at the respective terminals, the protection channels of the separate connection links forming a discontinuous ring with gaps between the protection channels at the nodes, and a switch at each node via which the protection channels, but not the working channels, are coupled to the terminals at the node, the switches being operable, in response to a failure of a protection switch to restore communication of normal traffic via the protection channel of a communication link between two terminals at respective nodes, to restore communication of said normal traffic via the protection channels of the communication links around the remainder of the ring and to bridge said gaps between the protection channels at any nodes around said remainder of the ring.

17. A system as claimed in claim 16 wherein the communication links comprise optical communication links and the switches at the nodes comprise optical switches.

18. A system as claimed in claim 17 wherein each protection channel provides bidirectional communications of optical signals at first and second wavelengths for opposite directions of communication, all of the protection channels of the separate communication links using said first wavelength for communications in a first direction around the discontinuous ring and all of the protection channels using said second wavelength for communications in a second direction around the discontinuous ring.

19. A system as claimed in claim 16 wherein at least one node includes a signal regenerator or amplifier via which the switch at this node is arranged to couple the protection channels to bridge the gap between the protection channels at this node.

20. A system as claimed in claim 16 wherein the different communication links and respective terminals are arranged to communicate different combinations of synchronous and asynchronous signals, different transmission speeds, and/or different numbers of working channels.

* * * * *